(12) United States Patent
Hertzberg (10) Patent No.: US 11,661,658 B2
(45) Date of Patent: May 30, 2023

(54) ELECTROCHEMICAL SYNTHESIS OF AMMONIA

(71) Applicant: Benjamin Joseph Hertzberg, New York, NY (US)

(72) Inventor: Benjamin Joseph Hertzberg, New York, NY (US)

( * ) Notice: Subject to any disclaimer, the term of this patent is extended or adjusted under 35 U.S.C. 154(b) by 739 days.

(21) Appl. No.: 16/442,021

(22) Filed: Jun. 14, 2019

(65) Prior Publication Data

US 2019/0382904 A1 Dec. 19, 2019

Related U.S. Application Data

(60) Provisional application No. 62/685,339, filed on Jun. 15, 2018.

(51) Int. Cl.
*C25B 9/19* (2021.01)
*C25B 1/27* (2021.01)
*C25B 11/075* (2021.01)
*C25B 1/00* (2021.01)

(52) U.S. Cl.
CPC .................. *C25B 1/00* (2013.01); *C25B 1/27* (2021.01); *C25B 9/19* (2021.01); *C25B 11/075* (2021.01)

(58) Field of Classification Search
CPC ..................................... C25B 1/27; C25B 1/00
See application file for complete search history.

(56) References Cited

U.S. PATENT DOCUMENTS

| 2,138,122 | A * | 11/1938 | Roberts, Jr. | C01C 1/0488 423/353 |
| 2003/0164305 | A1 * | 9/2003 | Denvir | C25B 1/00 205/360 |
| 2006/0049063 | A1 * | 3/2006 | Murphy | C25B 1/00 205/552 |
| 2016/0138176 | A1 * | 5/2016 | Yoo | C25B 15/02 204/239 |
| 2016/0194767 | A1 * | 7/2016 | Mulder | C25B 1/00 205/338 |
| 2016/0251765 | A1 * | 9/2016 | Botte | C25B 1/00 205/552 |
| 2019/0376193 | A1 * | 12/2019 | Liu | C25B 13/04 |

OTHER PUBLICATIONS

Smith et al, Deep Eutectic Solvents (DESs) and Their Applications, Chemical Reviews, vol. 114, No. 21, Oct. 2014, pp. 11060-11082 (Year: 2014).*

(Continued)

*Primary Examiner* — Harry D Wilkins, III
(74) *Attorney, Agent, or Firm* — Muncy, Geissler, Olds & Lowe, P.C.

(57) ABSTRACT

Systems and methods for electrochemical ammonia synthesis comprise electrolytes which have greater efficiency than water, thus leading to cost reductions; and/or cathode catalysts which have lower costs and higher efficiencies in comparison to the iron/nickel catalysts noted above. The electrolyte may be composed primarily of a combination of non-aqueous hydrogen bond donors and acceptors, with high nitrogen solubility and high conductivity. The cathode catalyst may be composed of either a manganese-doped oxide or carbonate material or a two-dimensional carbide or nitride material.

20 Claims, 5 Drawing Sheets

(56) References Cited

OTHER PUBLICATIONS

Altamash et al, Gas solubility and rheological behavior study of betaine and alanine based natural deep eutectic solvents (NADES), Journal of Molecular Liquids, vol. 256, Apr. 2018, pp. 286-295 (Year: 2018).*

Li et al, Computational Study of MoN2 Monolayer as Electrochemical Catalysts for Nitrogen Reduction, Journal of Physical Chemistry C, vol. 121, Issue 49, Nov. 2017, pp. 27563-27568 (Year: 2017).*

Liu et al, Catalytic Ammonia Synthesis over Mo Nitride/ZSM-5, ChemCatChem, vol. 2, No. 2, Feb. 2010, pp. 167-174 (Year: 2010).*

* cited by examiner

ELECTROCHEMICAL SYNTHESIS OF AMMONIA

PRIORITY CLAIM

The present Application for Patent claims the benefit of U.S. Provisional Patent Application No. 62/685,339 entitled "ELECTROCHEMICAL SYNTHESIS OF AMMONIA," filed Jun. 15, 2018, assigned to the assignee hereof, and expressly incorporated herein by reference in its entirety.

FIELD OF DISCLOSURE

Disclosed aspects are directed to electrochemical synthesis of ammonia. More specifically, exemplary aspects are directed to ammonia synthesis, comprising one or more of: an electrolyte composed primarily of a combination of non-aqueous hydrogen bond donors and acceptors, with high nitrogen solubility and high conductivity; or a cathode catalyst composed of either a manganese-doped oxide or carbonate material or a two-dimensional carbide or nitride material.

BACKGROUND

Figure 1:
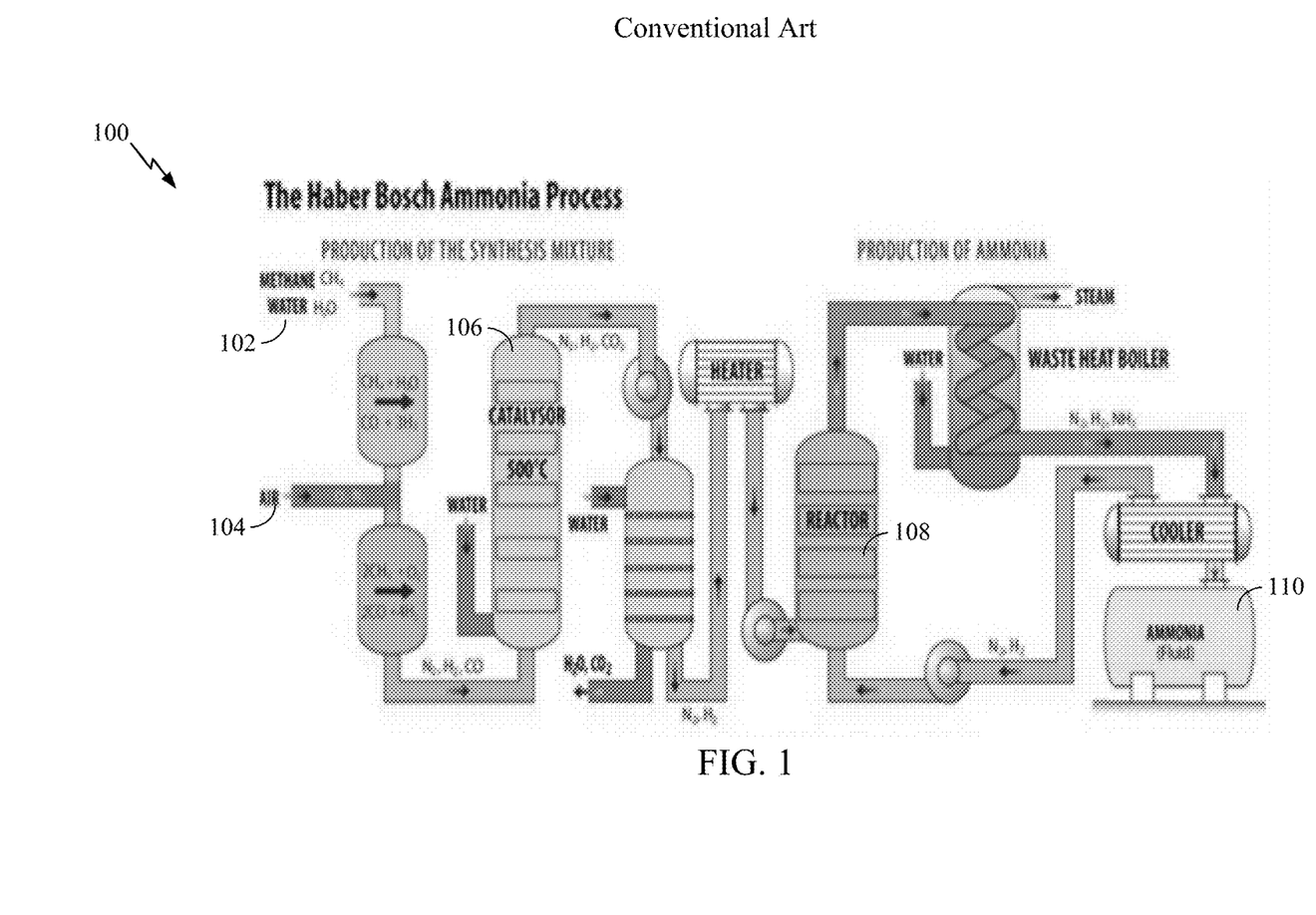
FIG. 1 illustrates a conventional Haber-Bosch Ammonia production system.

Ammonia is used for making plastics, explosives, and, importantly, fertilizers. Modern agriculture may utilize nitrogen fertilizers such as ammonium nitrate in large quantities. A popular process currently used in the production of ammonium nitrate is the well-known Haber-Bosch process. FIG. 1 shows system 100 for producing ammonia 110 using the Haber-Bosch process. In system 100, the reference numeral 102 depicts hydrogen gas, derived from natural gas, used as feedstock. Atmospheric nitrogen 104 is caused to react with the hydrogen gas in reactor 108. Catalysor 106, comprising, for example, iron catalysts is used to help as a catalyst for the reaction. However, the use of iron catalysts is expensive and suffers from inefficiencies.

The Haber-Bosch process also requires high temperatures, e.g., 400-500° C. and high pressures, e.g., 15 to 25 Mpa. By known estimates, 3-5% of the world's natural gas supply is consumed as part of the Haber-Bosch process.

Given the high demand but high costs of production, it is desirable to make ammonia synthesis both more affordable and more sustainable.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

Exemplary aspects of this disclosure are directed to systems and methods for electrochemical ammonia synthesis using electrolytes which have greater efficiency than water, thus leading to cost reductions; and/or using cathode catalysts which have lower costs and higher efficiencies in comparison to the iron/nickel catalysts noted above. More specifically, some aspects of the exemplary electrochemical ammonia synthesis utilize an electrolyte composed primarily of a combination of non-aqueous hydrogen bond donors and acceptors, with high nitrogen solubility and high conductivity. Aspects of the exemplary electrochemical ammonia synthesis are also directed to a cathode catalyst composed of either a manganese-doped oxide or carbonate material or a two-dimensional carbide or nitride material.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments of the disclosed subject matter include the discussed feature, advantage or mode of operation.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, processes, operations, elements, and/or components, but do not preclude the presence or addition of one or more other features, integers, processes, operations, elements, components, and/or groups thereof.

Aspects of this disclosure are directed to making ammonia synthesis more affordable and more sustainable. In this regard, processes of electrochemical ammonia synthesis are described, which can be carried out at room temperature and pressure. Exemplary processes involve electrochemical ammonia synthesis using water feedstock instead of hydrogen, which saves on expensive pressure vessels and reduces/eliminates carbon emissions caused by from methane reforming.

It is recognized that existing electrochemical ammonia synthesis technology, while utilizing aqueous or ionic liquid electrolytes, continue to require hydrogen feedstock, and typically use iron/nickel catalysts which are expensive and inefficient.

To overcome the above-noted limitations of the existing approaches, embodiments disclosed herein are directed to electrochemical ammonia synthesis using electrolytes which have greater efficiency than water, thus leading to cost reductions; and/or using cathode catalysts which have lower costs and higher efficiencies in comparison to the iron/nickel catalysts noted above. More specifically, some aspects of the exemplary electrochemical ammonia synthesis utilize an electrolyte composed primarily of a combination of non-aqueous hydrogen bond donors and acceptors, with high nitrogen solubility and high conductivity. Aspects of the exemplary electrochemical ammonia synthesis are also directed to a cathode catalyst composed of either a manganese-doped oxide or carbonate material or a two-dimensional carbide or nitride material. These aspects will be discussed further below.

Figure 2A:
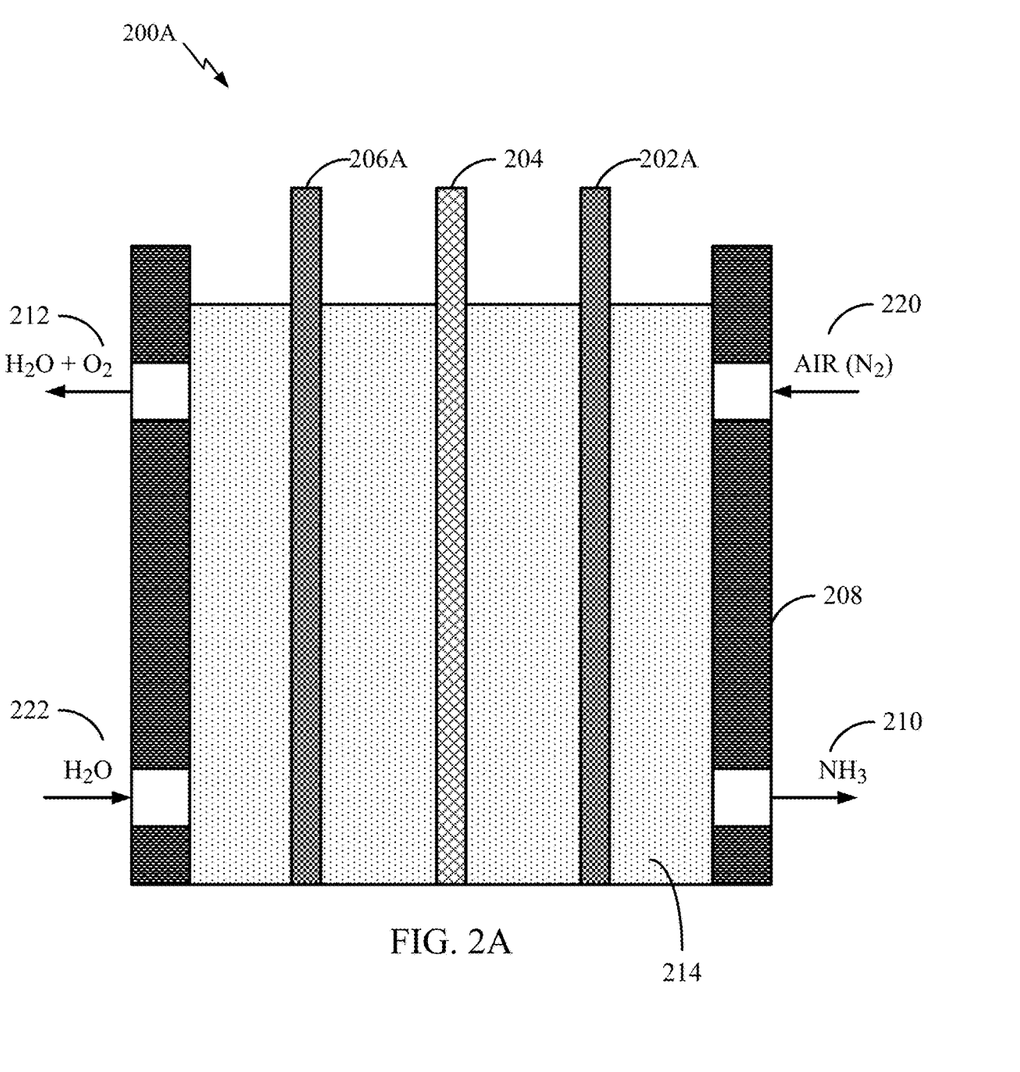
FIGS. 2A and 2B illustrate examples of reactor system used in exemplary ammonia production processes according to one or more aspects.

With reference to FIG. 2A, an exemplary embodiment of a reaction system for ammonia synthesis. Specifically, FIG. 2A shows reactor 200A (which may replace conventional reactor 108 shown in FIG. 1). Reactor 200A may be a parallel plate reactor used for ammonia synthesis according to this disclosure.

In more detail, reactor 200A may be a parallel plate system comprising opposing cathode 202A and anode 206A plates with electrolyte 214 in between, separated by a membrane 204 or diaphragm of some kind, wherein gaseous (e.g., air, nitrogen) and/or liquid (e.g., water) reactants 220, 222 are continuously introduced into a container vessel 208 and ammonia 210 and oxygen 212 products are continuously removed from the container vessel 208 via either mechanical or electrochemical methods.

Figure 2B:
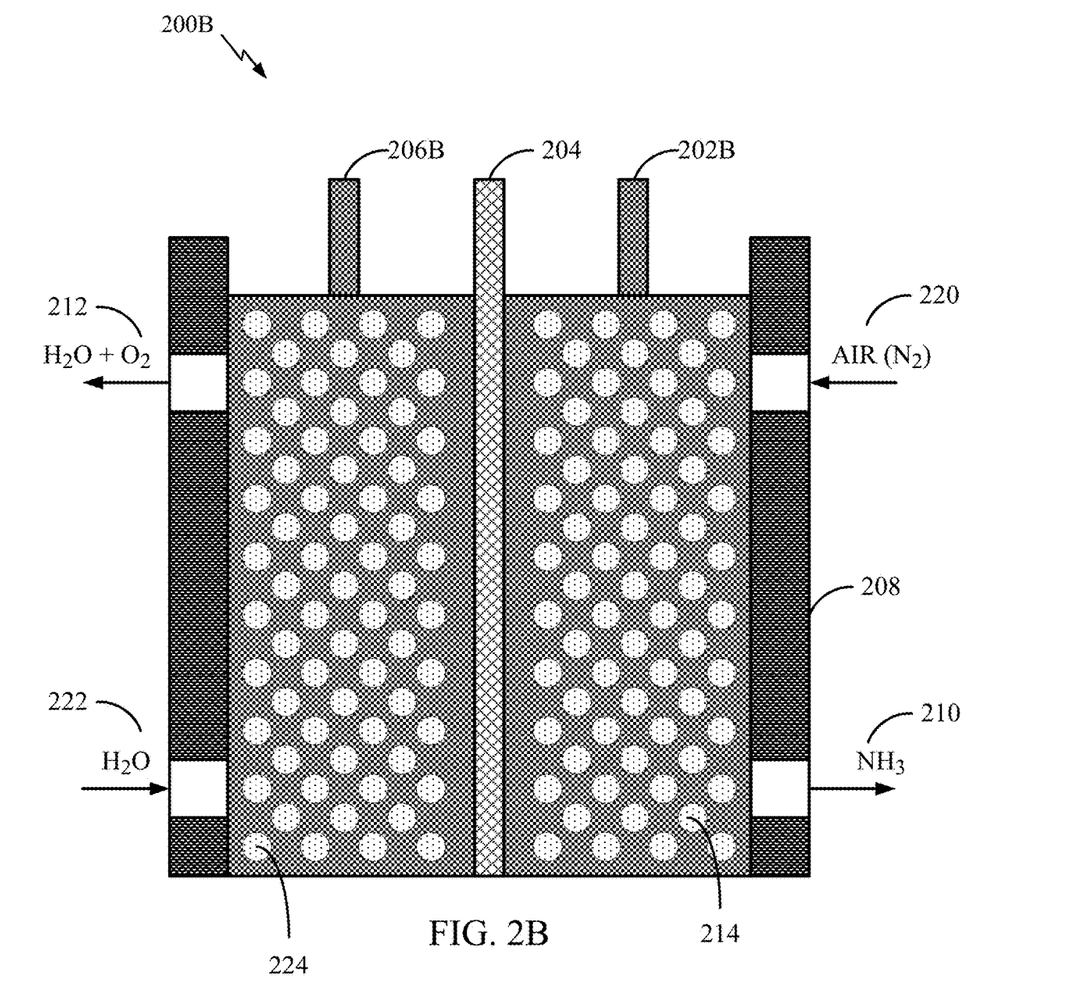

FIG. 2B illustrates another exemplary embodiment of a reaction system. Reactor 200B shown in FIG. 2B may also be in a parallel plate configuration and comprise opposing cathode 202B and anode 206B plates with electrolyte 214 separated by a membrane 204. Similar to the reactor 200A, gaseous and/or liquid reactants 220, 222 are continuously introduced into the container vessel 208 and ammonia 210 and oxygen 212 products are continuously removed from the container vessel 208.

However, there are some differences between reactors 200A and 200B. The primary differences are in the structures of their cathodes and anodes. More specifically, the cathode 202A and anode 206A of the reactor 200A are solid structures. On the other hand, the cathode 202B and anode 206B of the reactor 200B are porous such that the electrolyte 214 occupies pores 224 formed within the cathode 202B and anode 206B. This enhances the ammonia synthesis process by increasing surface areas of the cathode 202B and anode 206B and improving flow through of reactants.

Also, the cathode 202B and anode 206B can occupy entirety of the available space in the reactor 200B, at least width wise, other than the space occupied by the membrane 204. That is, for at least some vertical portion of the reactor 200B, an entire width of that vertical portion inside the reactor 200B, other than a width occupied by the membrane 204, may be occupied by the cathode 202B and the anode 206B.

In alternative embodiments, a reactor such as reactor 200A and/or 200B may comprise a prismatic configuration, wherein flexible anode and cathode plates may be rolled together into a cylindrical reactor system.

As previously noted, the exemplary electrochemical ammonia synthesis may utilize an electrolyte composed primarily of a combination of non-aqueous hydrogen bond donors and acceptors, with high nitrogen solubility and high conductivity. Accordingly, electrolyte 214 may be a non-aqueous electrolyte, which may be used in an electrolytic cell comprising deep eutectic solvents. Electrolyte 214 may be selected from one or more of (1) one or more metal salts (e.g., metal halide salts), one or more hydrate salts thereof, or any combination thereof; (2) one or more hydrogen bond acceptors; and (3) one or more hydrogen bond donors. That is, electrolyte 214 may be selected from any combination of (1), (2), and/or (3).

Metal salts of the electrolyte 214 may include salts formed from combining one or more metal cations with one or more anions. Examples of metal cations may include any one or more of (i.e., any combination of) zinc, nickel, iron, etc. Since these are merely "examples", the list of metal cations should not be taken to be exhaustive. Similarly, other lists of examples (e.g., anions, hydrogen bond acceptors, hydrogen bond donors, etc.) also should not be taken to be exhaustive unless specifically indicated otherwise.

Anions may include any one or more of organic acid anions, inorganic acid anions, and so on. Examples of organic acid anions may include any one or more of acetate, lactate, etc. Examples of inorganic acid anions may include any one or more of nitrate, sulfate, fluoride, chloride, bromide, iodide, etc. Specific examples of metal salts include $ZnCl_2$ (e.g., when zinc is combined with chloride) and $ZnBr_2$ (e.g., when zinc is combined with bromide).

Examples of hydrogen bond acceptors may include one or more quaternary ammonium salts and/or one or more zwitterionic salts, or more generally, zwitteronic compounds. Examples of zwitterionic compounds may include any one or more of alanines, betaines, 3-[(3-Cholamidopropyl)dimethylammonio]-1-propanesulfonate (CHAPS), cocamidopropyl hydroxysultaine, etc., and similar compounds containing both ions with both positive and negative charges and a net charge of zero.

The hydrogen bond donors may include one or more organic compounds with a covalently bonded hydrogen atom. Examples of such organic compounds may include any one or more of quaternary ammonium compounds, urea, methylurea, acetamide, imidazole, glycerol, ethylene glycol, phenol, o-cresol, xylenol, xylitol, sorbitol, isosorbide, fructose, glucose, saturated and/or unsaturated carboxylic acids, etc., and longer-chain analogues thereof, etc. Examples of carboxylic acids may include any one or more of oxalic acid, lactic acid, malonic acid, carbonic acid, formic acid, acetic acid, propionic acid, mellitic acid, tartronic acid, tartaric acid, acetoacetic acid, succinic acid, butyric acid, valeric acid, caproic acid, enanthic acid, capyrlic acid, pelargonic acid, capric acid, etc.

It should be noted that some or all organic compounds listed for the hydrogen bond donors may also be used as hydrogen bond acceptors. The difference would be that in the hydrogen bond acceptors would lack the covalently bonded hydrogen.

Further, as also noted previously, embodiments of the exemplary electrochemical ammonia synthesis may include a cathode catalyst composed of either a manganese-doped oxide or carbonate material or a two-dimensional carbide or nitride material. Exemplary materials which may be used for cathode 202A, 202B may comprise a solid catalytic material selected from one of: (1) a solid carbonate or oxide material, such as calcium carbonate or iron oxide, doped with manganese to enhance its catalytic capacity; or (2) a two-dimensional metal carbide, nitride, or carbonitride such as MXenes or MAXenes.

In detail, the cathode may comprise a solid catalytic material, also referred to as solid cathode material, distributed onto a current collector. Indeed, in FIG. 2B above, the porosity of the electrodes may be provided for by the by the distribution of the solid cathode material on to the current collector (not specifically shown). The solid cathode material may include one or more metals. For ease of reference, the metals used for the solid cathode material will be referred to as cathode metals. The cathode metals may include any one or more of palladium, platinum, silver, iron, nickel, ruthenium, etc. Alternatively or in addition thereto, the solid cathode material may comprise any one or more of alloys of the cathode metals, solid carbonates of the cathode metals, oxides of the cathode metals, nitrides of the cathode metals, carbides of the cathode metals and carbonitrides of the cathode metals.

The solid cathode material may be doped with a catalyst, which may include one or more metals. Again for ease of reference, the metals used as the catalyst will be referred to as catalyst metals. The catalyst metals may include any one or more of manganese, magnesium, palladium, platinum, iron, etc. Alternatively or in addition thereto, the catalyst may comprise any one or more of alloys of oxides of the catalyst metals, nitrides of the catalyst metals, and carbonates of the cathode metals. It should be noted that the catalyst is not required (i.e., is optional).

It is noted that there are some materials that are common to both the solid cathode materials and the catalyst. For example, palladium and iron are included in both the list of solid cathode materials and list of catalyst materials. Thus, it is possible that in one instance, the cathode is formed from palladium as the solid cathode material and iron as the catalyst, and in another instance, the cathode is formed from iron as the solid cathode material and palladium as the catalyst. However, if the solid cathode material is more prevalent than the catalyst, then the cathodes of the two instances may be different. That is, a cathode that is 99% palladium and 1% iron as the catalyst may have very different catalytic characteristics than a cathode that is 99% iron and 1% palladium as the catalyst.

Alternative to the cathode metals, the solid cathode material can comprise any one or more of a two-dimensional metal carbide, a two-dimensional metal nitride, and a two-dimensional metal carbonitride.

To illustrate exemplary advantages of the above embodiments, the following experimental results are provided, while emphasizing that these are merely illustrative and not to be construed as limitations. In one example of system 200 wherein electrolyte 214 comprises a 57 wt % water electrolyte, water/air are used as reactants, and cathode 202 comprises a manganese-doped carbonate cathode catalyst, a production rate of ammonia 210 is observed to be 1.196E-5 mol/m^2*s, at an efficiency of 21.1%. By contrast, using a current state of the art production system of ammonia (e.g., as discussed in FIG. 1), at room-temperature and using water based catalysts, provides a production rate: of 1.14E-5 mol/m^2*s at an efficiency of 0.55%. Accordingly, a comparison of the exemplary embodiments and the state of the art shows significant improvement in ammonia production and efficiency using the exemplary embodiments.

Figure 3:
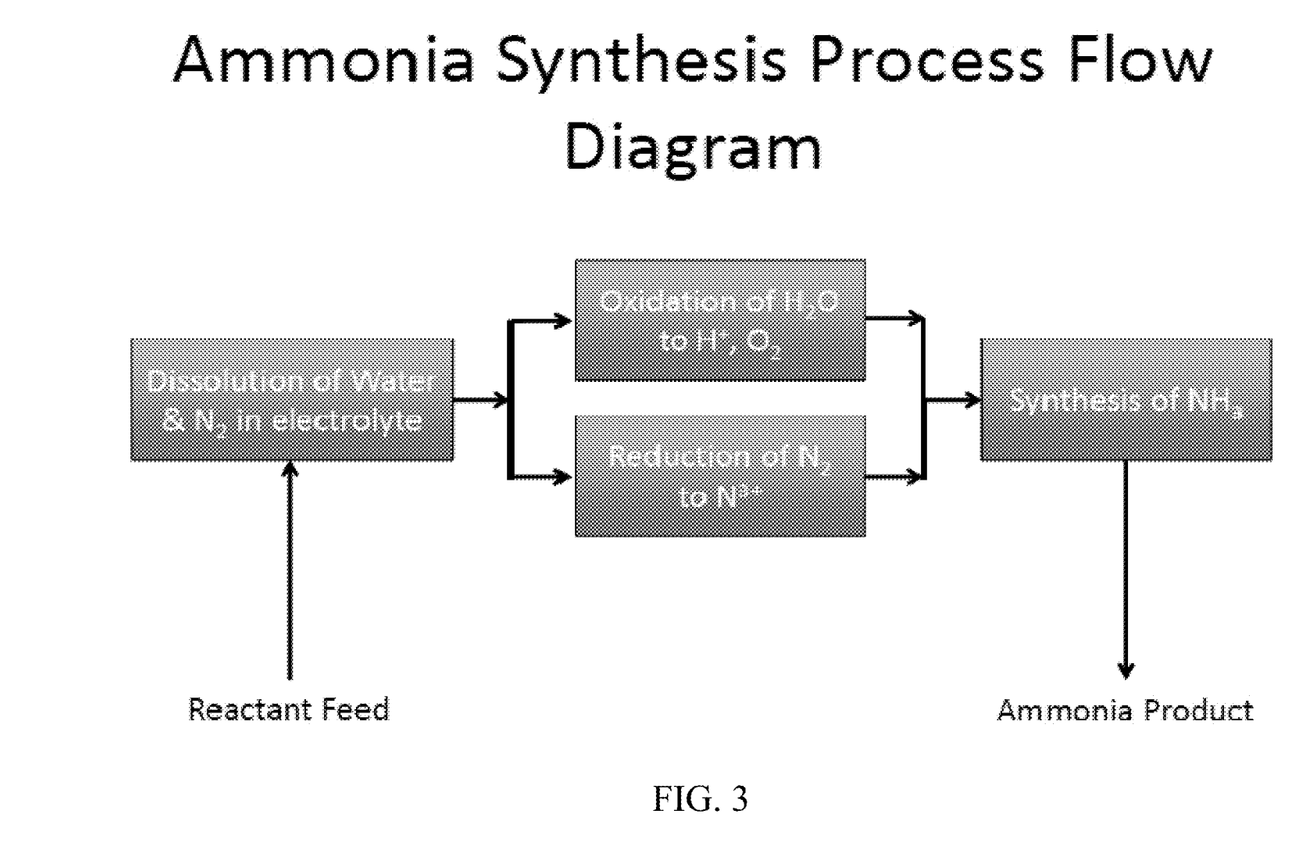
FIG. 3 illustrates an example diagram of ammonia synthesis process flow according to one or more aspects.

FIG. 3 illustrates a diagram of an example ammonia synthesis process flow according to one or more aspects. As seen, reactants (e.g., water, air) are fed into the reactor resulting in dissolution of water $H_2O$ and nitrogen $N_2$ in electrolyte. Water $H_2O$ is oxidized to $H^+$ and oxygen $O_2$, and nitrogen $N_2$ is reduced to $N^{3+}$ and ammonia $NH_3$. Ammonia $NH_3$ is removed from the reactor.

Figure 4:
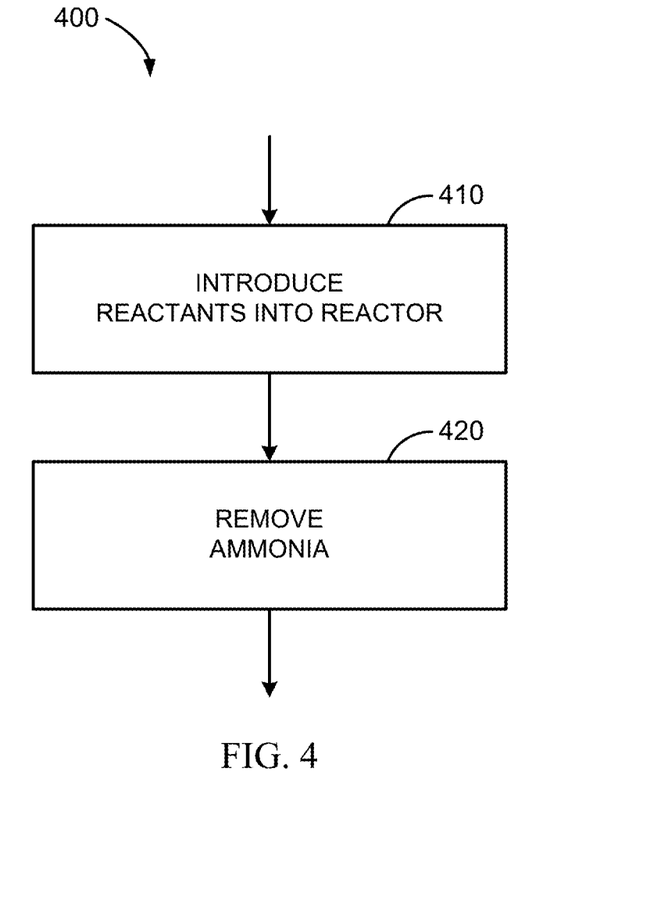
FIG. 4 illustrates a flow chart of an exemplary method of synthesizing ammonia according to one or more aspects.

FIG. 4 illustrates a flow chart of an exemplary method of synthesizing ammonia. In block 410, reactants may be introduced into a reactor, such as the reactor 200A or 200B. In block 420, the ammonia may be removed from the reactor. As indicated, blocks 410 and 420 may be performed continuously. That is, the reactants may be continuously introduced while the ammonia is continuously removed. The ammonia may be removed through mechanical and/or electrochemical methods.

The foregoing description is provided to enable any person skilled in the art to make or use aspects of the present invention. It will be appreciated, however, that the present invention is not limited to the particular formulations, process steps, and materials disclosed herein, as various modifications to these aspects will be readily apparent to those skilled in the art. That is, the generic principles defined herein may be applied to other aspects without departing from the spirit or scope of the invention.

What is claimed is:

1. A reactor for ammonia synthesis, the reactor comprising:
   cathode;
   an anode;
   a non-aqueous electrolyte between the cathode and the anode;
   a source of air or nitrogen in communication with the cathode; and
   a source of water in communication with the anode,
   wherein the cathode comprises a solid cathode material doped with a catalyst, and
   wherein the reactor is configured to carry out the ammonia synthesis at room temperature and pressure.

2. The reactor of claim 1, wherein the non-aqueous electrolyte comprises one or more deep eutectic solvents.

3. The reactor of claim 2, wherein the deep eutectic solvents comprise one or more of:
   one or more metal salts and/or one or more hydrate salts thereof,
   one or more hydrogen bond acceptors, and
   one or more hydrogen bond donors.

4. The reactor of claim 3,
   wherein the metal salts comprise salts formed from combining one or more metal cations with one or more anions, the anions comprising one or more organic acid anions and/or one or more inorganic acid anions,
   wherein the hydrogen bond acceptors comprise one or more quaternary ammonium salts and/or one or more zwitterionic compounds, and
   wherein the hydrogen bond donors comprise one or more organic compounds with a covalently bonded hydrogen atom.

5. The reactor of claim 4,
   wherein the metal cations comprise one or more of zinc, nickel, and iron,
   wherein the organic acid anions comprise one or more of acetate and lactate, and
   wherein the inorganic acid anions comprise one or more of nitrate, sulfate, fluoride, chloride, bromide, and iodide.

6. The reactor of claim 4,
   wherein the zwitterionic compounds comprise one or more of alanines, betaines, 3-[(3-Cholamidopropyl)dimethylammonio]-1-propanesulfonate (CHAPS), and cocamidopropyl hydroxysultaine, and
   wherein the organic compounds comprise one or more of quaternary ammonium compounds, urea, methylurea, acetamide, imidazole, glycerol, ethylene glycol, phenol, o-cresol, xylenol, xylitol, sorbitol, isosorbide, fructose, glucose, and carboxylic acids.

7. The reactor of claim 1, wherein the solid cathode material comprises one or more of:

one or more cathode metals comprising one or more of palladium, platinum, silver, iron, nickel, and ruthenium,
one or more alloys of the cathode metals,
one or more solid carbonates of the cathode metals,
one or more oxides of the cathode metals,
one or more nitrides of the cathode metals,
one or more carbides of the cathode metals, and
one or more carbonitrides of the cathode metals.

8. The reactor of claim 1, wherein the catalyst comprises one or more of:
one or more catalyst metals comprising one or more of manganese, magnesium, platinum, palladium, ruthenium, and iron,
one or more oxides of the catalyst metals,
one or more nitrides of the catalyst metals, and
one or more carbonates of the catalyst metals.

9. The reactor of claim 1, further comprising:
a membrane,
wherein the reactor is a parallel plate reactor with the cathode and the anode formed as parallel plates and the membrane separating the parallel plates.

10. The reactor of claim 1, further comprising:
a membrane separating the cathode and the anode,
wherein the cathode and/or the anode are porous such that the non-aqueous electrolyte occupies the pores of the cathode and/or the anode.

11. The reactor of claim 10, wherein for at least some vertical portion of the reactor, an entire width of that vertical portion inside the reactor, other than a width occupied by the membrane, is occupied by the cathode and the anode.

12. A reactor for ammonia synthesis, the reactor comprising:
a cathode;
an anode;
a non-aqueous electrolyte between the cathode and the anode;
a source of air or nitrogen in communication with the cathode; and
a source of water in communication with the anode,
wherein the cathode comprises a solid cathode material comprising one or more of a two-dimensional metal carbide, a two-dimensional metal nitride, and a two-dimensional metal carbonitride, and
wherein the reactor is configured to carry out the ammonia synthesis at room temperature and pressure.

13. The reactor of claim 12, wherein the non-aqueous electrolyte comprises one or more deep eutectic solvents.

14. The reactor of claim 13, wherein the deep eutectic solvents comprise one or more of:
one or more metal salts and/or one or more hydrate salts thereof,
one or more hydrogen bond acceptors, and
one or more hydrogen bond donors.

15. The reactor of claim 14,
wherein the metal salts comprise salts formed from combining one or more metal cations with one or more anions, the anions comprising one or more organic acid anions and/or one or more inorganic acid anions,
wherein the hydrogen bond acceptors comprise one or more quaternary ammonium salts and/or one or more zwitterionic compounds, and
wherein the hydrogen bond donors comprise one or more organic compounds with a covalently bonded hydrogen atom.

16. The reactor of claim 15,
wherein the metal cations comprise one or more of zinc, nickel, and iron,
wherein the organic acid anions comprise one or more of acetate and lactate, and
wherein the inorganic acid anions comprise one or more of nitrate, sulfate, fluoride, chloride, bromide, and iodide.

17. The reactor of claim 15,
wherein the zwitterionic compounds comprise one or more of alanines, betaines, 3[(3-Cholamidopropyl)dimethylammonio]-1-propanesulfonate (CHAPS), and cocamidopropyl hydroxysultaine, and
wherein the organic compounds comprise one or more of quaternary ammonium compounds, urea, methylurea, acetamide, imidazole, glycerol, ethylene glycol, phenol, o-cresol, xylenol, xylitol, sorbitol, isosorbide, fructose, glucose, and carboxylic acids.

18. The reactor of claim 12, further comprising:
a membrane,
wherein the reactor is a parallel plate reactor with the cathode and the anode formed as parallel plates and the membrane separating the parallel plates.

19. The reactor of claim 12, further comprising:
a membrane separating the cathode and the anode,
wherein the cathode and/or the anode are porous such that the non-aqueous electrolyte occupies the pores of the cathode and/or the anode.

20. The reactor of claim 19, wherein for at least some vertical portion of the reactor, an entire width of that vertical portion inside the reactor, other than a width occupied by the membrane, is occupied by the cathode and the anode.

* * * * *